United States Patent [19]

Mathews

[11] Patent Number: 5,052,003

[45] Date of Patent: Sep. 24, 1991

[54] QUASI-OPTICAL GYROTRON

[75] Inventor: Hans-Günter Mathews, Oberehrendingen, Switzerland

[73] Assignee: Asea Brown Boveri Ltd., Baden, Switzerland

[21] Appl. No.: 531,104

[22] Filed: May 31, 1990

[30] Foreign Application Priority Data

Jun. 23, 1989 [CH] Switzerland ........................ 2349/89

[51] Int. Cl.[5] ................................................ H01S 3/00

[52] U.S. Cl. .......................................... 372/2; 372/92; 315/4; 315/5

[58] Field of Search ...................... 372/2, 92; 315/3, 4, 315/5

[56] References Cited

U.S. PATENT DOCUMENTS

| | | | |
|---|---|---|---|
| 2,383,343 | 8/1945 | Ryan . | |
| 4,559,475 | 12/1985 | Manheimel et al. | 372/2 |
| 4,839,561 | 6/1989 | Ito | 315/3 |
| 4,926,094 | 5/1980 | Bondeson et al. | 372/2 |

OTHER PUBLICATIONS

International Journal of Electronics, vol. 57, No. 6, Dec. 1984, pp. 787–799, V. L. Granastein, "High Average Power and High Peak Gyrotrons: Prensent Capabilities and Future Prospects".

International Electron Devices Meeting, Washington, D.C., U.S., Dec. 6–9, 1987, pp. 804–807, K. E. Kreischer, et al., "Operation of a Step Tunable, Megawatt Gyrotron".

*Primary Examiner*—Leon Scott, Jr.

*Attorney, Agent, or Firm*—Oblon, Spivak, McClelland, Maier & Neustadt

[57] ABSTRACT

In a quasi-optical gyrotron, two coils (3*a*, 3*b*) in a Helmholtz arrangement generrate a static magnetic field aligned parallel to an electron beam axis (2). As a result, the electrons passing along the electron beam axis (2) parallel to the magnetic field are forced into gyration and excite an alternating electromagnetic field in a quasi-optical resonator. The resonator comprises two mirrors (4*a*, 4*b*) arranged opposite to one another on a resonator axis (5). The resonator axis (5) is aligned perpendicularly to the electron beam axis (2) between the two coils (3*a*, 3*b*). The mirrors exhibit a mutual distance which is much greater than one half wavelength of the electromagnetic radiation. To generate a wideband radiation, at least one mirror, (4*b*) is moved at a high frequency by at least about one half wavelength of the electromagnetic radiation by a vibrator (10).

10 Claims, 1 Drawing Sheet

QUASI-OPTICAL GYROTRON

BACKGROUND OF THE INVENTION

1. Field of the Invention

The invention relates to a quasi-optical gyrotron for generating electromagnetic radiation in the millimeter and submillimeter range, in which electrons passing along an electron beam axis are forced into gyration by a static magnetic field aligned parallel to the electron beam axis and excite in a quasi-optical resonator, which comprises two mirrors arranged opposite to one another on a resonator axis aligned perpendicular to the electron beam axis, an alternating electromagnetic field so that the electromagnetic radiation can be coupled out of the resonator.

2. Discussion of Background

A quasi-optical gyrotron of the type initially mentioned is known, for example, from the Patent CH-664045 or from the article "Das Gyrotron, Schlüsselkomponente für Hochleistungs-Mikrowellensender" (The gyrotron, key component for high-power microwave transmitters), H. G. Mathews, Minh Quang Tran, Brown Boveri Review 6-1987, pp. 303-307. Such a gyrotron can be used for generating electromagnetic radiation with high power in a frequency range of typically more than 100 GHz.

All previously known high-power sources for millimeter and submillimeter waves are distinguished by the fact that they operate at a fixed frequency and with an extremely narrow bandwidth. In the quasi-optical gyrotron, for example, this bandwidth is only a few MHz. In certain communications engineering applications (for example in the so-called "electronic countermeasures"), however, it is sometimes required for high-frequency radiation of wide bandwidths to be available.

If it is, for example, a matter of disturbing or preventing an electromagnetic communications link, it is not sufficient to interfere by means of an interference transmitter having a high power but a fixed frequency. This is because it is known that such "jamming" can be avoided by systematic frequency hopping.

If, however, it is possible to cover a wide frequency band by means of the interference transmitter, the frequency hopping must also fail.

SUMMARY OF THE INVENTION

Accordingly, one object of this invention is to provide quite generally a novel millimeter source having a wide bandwidth and high power.

In particular, it is also an object of the invention to specify a quasi-optical gyrotron of the type initially mentioned which is capable of generating radiation in the form of millimeter and submillimeter waves having a relatively wide bandwidth.

According to the invention, the object is achieved by the fact that the mirrors of the quasi-optical resonator exhibit a mutual distance which is much greater than one half wavelength of the electromagnetic radiation and means for the high-frequency varying of the distance between the mirrors are provided which vary the distance by at least about one half wavelength of the electromagnetic radiation.

The radiation is preferably generated in the form of pulses which have a pulse duration of no more than about 10 ms. In this connection, the means for the high-frequency varying operate at a frequency which is much greater than the inverse pulse duration. It is typically of the order of magnitude of a multiple of the inverse pulse duration.

When the radiation is coupled out of the resonator at one mirror, it is of advantage when the other mirror is mounted on a vibrator and is moved with a vibration amplitude which is no less than about one half wavelength of the electromagnetic radiation.

It is of advantage for certain embodiments if two vibrators are provided, that is to say one for each mirror. In this case, each vibrator operates at a vibration amplitude which corresponds to about one quarter of one wavelength of the electromagnetic radiation.

In order to further increase the mean bandwidth of the electromagnetic radiation, means for gene-rating a slowly changing auxiliary magnetic field, which is superimposed on the static magnetic field, can be provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
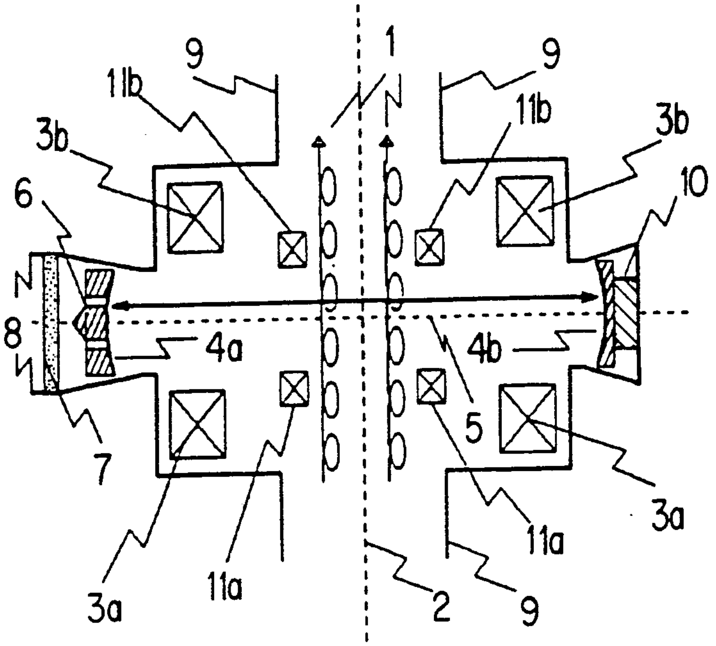
FIG. 1 shows a diagrammatic representation of a quasi-optical gyrotron.

FIGS. *2a–c* show a graphic representation of the spectrum of the radiation generated.

The reference symbols used in the drawing and their meaning are listed in a summary table in the list of designations. In principle, identical parts are provided with identical reference symbols.

DESCRIPTION OF THE PREFERRED EMBODIMENTS

Referring now to the drawings, FIG. 1 shows the parts essential to the explanation of the invention of a quasi-optical gyrotron according to the invention. An electron gun, not shown in the figure, injects electrons in the form of a, for example, annular electron beam 1. The electrons pass along an electron beam axis 2. Two coils 3*a* and 3*b* are arranged at a distance corresponding to their radius (so-called Helmholtz arrangement) on the electron beam axis 2. They generate a static magnetic field aligned parallel to the electron beam axis 2, which forces the electrons into gyration A quasi-optical resonator is arranged between the two coils 3*a*, 3*b*. It consists of two spherical circular mirrors 4*a* and 4*b* which are arranged opposite to one another on a resonator axis 5. In this arrangement, the resonator axis 5 is perpendicular to the electron beam axis 2.

The electrons excite an alternating electromagnetic field in the quasi-optical resonator so that the required microwaves are coupled out at one of the two mirrors 4*a*, which is provided for example with suitable annular coupling-out slots 6 for this purpose, and can be conducted to a load through a window 7 and waveguide 8. The two coils 3*a*, 3*b*, the resonator and, naturally, the electron beam 1 are located in a high vacuum in a vessel 9.

The parts of the quasi-optical gyrotron described up to now are already known (for example from the article by Mathews and Tran cited above) and therefore do not need any further explanation. In contrast, the means for the high-frequency varying of the distance of the mirrors to be explained in the text following are novel.

The two mirrors 4a, 4b of the resonator have a mutual distance D. It is known that this distance D determines the possible resonant frequencies of the resonator in the steady-state case. They are given by the condition that the distance D must be an integral multiple of one half wavelength of the alternating electromagnetic field. According to the invention, the distance is much greater than one half wavelength. As a result, several adjacent resonant frequencies can be excited simultaneously in the resonator by the electrons.

Figure 2A:
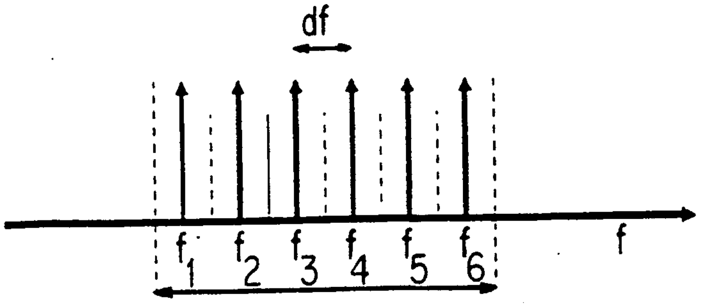

FIG. 2a shows a representation of this situation in the frequency domain. The frequency f is plotted along the abscissa. The abovementioned condition of resonance leads to a number of resonant frequencies $f_i$, i=1, 2, . . . , which in each case have a frequency spacing $df=c/2D$ (c=velocity of light) and a very narrow resonant width $\delta f=f_i/Q$ (Q=quality factor of the resonator).

In steady-state operation, a single strong mode exists as a rule in the resonator, which oscillates at one of the possible resonant frequencies $f_i$ (for example i=3). However, this does not apply to the non-steady-state case. This is because model calculations and tests have shown that the quasi-optical gyrotron starts oscillating in "multimode operation". During the start of oscillation, several different resonant frequencies are thus excited at the same time in the resonator. In this process, the corresponding modes have a fluctuating energy, opposing one another, as it were. Typically, about 10 modes are competing during the start-of-oscillation process (that is to say $f_i$, i=1, . . . , 10).

After a certain time, the gyrotron passes into the steady-state condition in which one mode having a particular resonant frequency is dominant.

For generating a wideband radiation in accordance with the invention, means for the high-frequency varying of the distance D of the mirrors are now provided. In the embodiment of FIG. 1, one of the mirrors 4b, preferably the one at which no radiation is coupled out, is mounted on a vibrator 10. The vibrator 10 is fixed, for example, to the vessel 9. It moves the mirror 4b to and fro on the resonator axis 5 with a vibration amplitude which corresponds to about one half wavelength.

The effect of the vibrator 10 can be explained with reference to FIG. 2a. The extremely narrow resonant frequencies $f_i$, $f_2$, . . . , $f_6$, the position of which is determined by the distance D of the mirrors, are displaced to and fro on the frequency axis due to variation of the distance D. If then the distance D varies by one half wavelength, the resonant frequencies are each displaced by the frequency spacing df. If thus, for example, six resonant frequencies $f_1$, . . . , $f_6$ oscillate at the same time in non-steady-state operation, the vibration of the mirror results in an entire frequency band $B(H_0)$ being covered.

The distance is varied at a high rate or a high frequency, respectively. In this connection, it is not absolutely necessary for the distance to vary at a predetermined high frequency. It may also be advantageous on occasions to vibrate the mirror arbitrarily periodically or else stochastically. In any case, the electromagnetic radiation generated will statistically cover the required bandwidth $B(H_0)$ due to the fluctuating energy of the various modes.

According to a preferred embodiment, the quasi-optical gyrotron operates in pulse mode so that radiation is generated in the form of pulses having a pulse duration of no more than about 10 ms. The vibrator then operates at a vibration frequency which is much greater than the inverse pulse duration of about 1/10 ms=100 Hz. A steady-state condition can never occur with such a pulse operation. The radiation generated thus always exhibits a maximum bandwidth $B(H_0)$.

The vibration frequency is preferably within a range of several 100 Hz to some kHz. In the concrete case, the magnitude of the required vibration amplitude and the mechanical vibration characteristics of the mirror play a significant rôle in determining the vibration frequency. It must be noted in this connection that the corresponding mirror is advantageously stochastically moved in the case of low vibration frequencies (some 100 Hz).

The high-frequency varying of the distance D of the mirrors 4a, 4b by at least one half wavelength can, naturally, also be achieved by each of the two mirrors 4a and 4b being mounted on its own vibrator. Each of the two vibrators then preferably operates at a vibration amplitude of only one quarter of the wavelength. This second embodiment of the invention is desirable particularly if high vibration amplitudes are required.

Piezoelectric oscillators known as such are preferably used as vibrators.

According to a further embodiment of the invention, means for generating a slowly changing auxiliary magnetic field are additionally provided. This has the task of modulating the field strength of the static magnetic field so that the frequency of gyration of the electrons changes slowly, that is to say from pulse to pulse, and the mean bandwidth of the electromagnetic radiation coupled out is additionally widened. The auxiliary magnetic field is thus superimposed on the static magnetic field. Essentially, it has the same direction and a field strength which is low compared with that of the static magnetic field.

FIG. 1 shows by way of an example, how these means for generating an auxiliary magnetic field can be produced. Two auxiliary coils 11a and 11b are arranged on both sides of the resonator axis 5 coaxially to the electron beam axis 2 in a Helmholtz arrangement. They thus generate in the vicinity close to the electron beam axis 2 the required slowly changing auxiliary magnetic field which is also essentially aligned parallel to the electron beam axis 2.

Figure 2B:
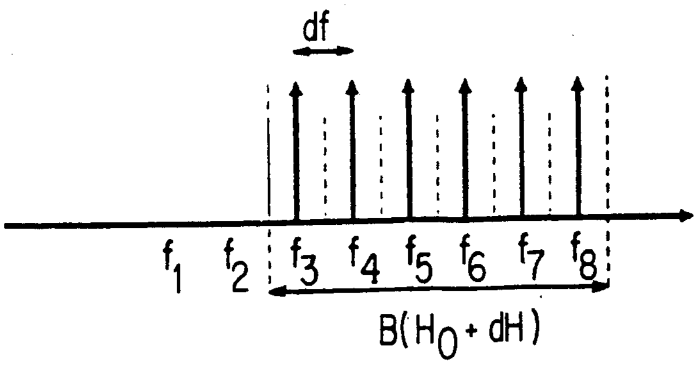
Figure 2C:
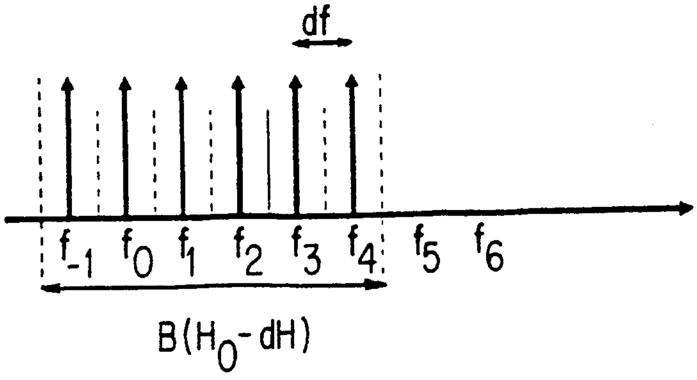

The action of the superimposed auxiliary magnetic field will now be explained with reference to FIGS. 2a–c. FIG. 2a shows the spectrum of the electromagnetic radiation when the auxiliary magnetic field disappears, that is to say at a magnetic field strength $H_0$ (static magnetic field). FIG. 2b shows the spectrum when the auxiliary magnetic field assumes the value +dH, that is to say at a total magnetic field strength of $H_0+dH$. The frequency of gyration of the electrons, which is higher due to the stronger magnetic field, leads to higher modes being excited in the resonator. The bandwidth $B(H_0+dH)$, which is shifted upward, now comprises, for example, the resonant frequencies $f_3$, . . . , $f_8$. If, on the other hand, shown in FIG. 2c, the bandwidth $B(H_0\text{-}dH)$ shifts downward since now, for example, the resonant frequencies $f_{-1}$, . . . , $f_4$ are excited. Overall, this additionally widens the bandwidth of the electromagnetic radiation in the mean overtime.

Generally, the auxiliary magnetic field cannot be changed rapidly enough for the widening of the mean bandwidth described above to occur within one single pulse. However, the displacement takes effect from pulse to pulse and leads to the widening of the bandwidth described, averaged over several pulses. This widening is typically of the order of magnitude of 10–20% of the bandwidth $B(H_0)$, that is to say without auxiliary magnetic field.

To illustrate the effect of the invention, a small numerical example will also be given. It is assumed here that the electromagnetic radiation of the gyrotron has a mean frequency (basic frequency) of 150 GHz. The wavelength (in vacuum) is then about 2 mm. With a distance between the mirrors of $D=400$ mm, the frequency spacing is $df=0.375$ GHz. When typically 10 resonant frequencies start to oscillate, a bandwidth $B(H_0)=3.75$ GHz is thus obtained, which corresponds to about 2.5% of the mean frequency of 150 GHz. The quasi-optical gyrotron according to the invention thus generates millimeter and submillimeter waves, the bandwidth of which is greater by a factor of about $10^3$ compared with the prior art.

It has previously always been assumed that the distance varies by about one half wavelength. It is clear that it is not possible to cover the entire spectral range of the given bandwidth with smaller changes (much less than one half wavelength). Instead, there are free gaps. However, it is well within the scope of the invention to vary the distance, for example periodically or irregularly by more than one half wavelength since this also covers the entire bandwidth.

In summary, it can be said that the invention has created a wideband high-power source for millimeter and submillimeter waves which is suitable, particularly, for use in interference transmitters.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

1—Electron beam; 2—Electron beam axis; 3*a*, 3*b*—Coils; 4*a*, 4*b*—Mirrors; 5—Resonator axis; 6—Coupling-out slot; 7—Window; 8—Waveguide; 9—Vessel; 10—Vibrator; 11*a*, 11*b*—Auxiliary coils.

What is claimed as new and desired to be secured by Letters Patent of the United States is:

1. A quasi-optical gyrotron for generating electromagnetic radiation in the millimeter and submillimeter range, comprising:

an electron gun generating electrons passing along an electron beam axis;

coil means for generating a static magnetic field aligned parallel to the electron beam axis such that the electrons are forced into gyration;

a quasi-optical resonator, which comprises two mirrors arranged opposite to one another on a resonator axis aligned perpendicular to the electron beam axis in which resonator the gyrating electrons excite an alternating electromagnetic field and generate electromagnetic radiation which is coupled out of the resonator;

the mirrors of the quasi-optical resonator separated by a distance which is much greater than one half wavelength of the electromagnetic radiation; and means for varying the distance between the mirrors by at least one half wavelength of the electromagnetic radiation.

2. A quasi-optical gyrotron as claimed in claim 1, wherein a) the electromagnetic radiation is generated in the form of pulses having a pulse duration of no more than about 10 ms and b) the means for varying of the distance operate at vibration frequencies which are a multiple of the inverse of the pulse duration.

3. A quasi-optical gyrotron as claimed in claim 2, wherein a) said coil means comprises two coils aligned coaxially to the electron beam axis in a Helmholtz arrangement and b) the resonator is arranged between the two coils.

4. A quasi-optical gyrotron as claimed in claim 1, wherein the means for varying of the distance comprise a vibrator which moves a mirror of the resonator along the resonator axis with a vibration amplitude which is at least as high as about one half wavelength of the electromagnetic radiation.

5. A quasi-optical gyrotron as claimed in claim 1, wherein the means for varying of the distance comprise for each of the two mirrors of the resonator one vibrator each, which moves the respective mirror of the resonator along the resonator axis in each case with a vibration amplitude which is at least as high as about one quarter of the wavelength of the electromagnetic radiation.

6. A quasi-optical gyrotron as claimed in claim 4 or 5, wherein the vibrators are piezoelectric oscillators.

7. A quasi-optical gyrotron as claimed in claim 1, wherein the electromagnetic radiation exhibits a frequency of more than about 100 GHz.

8./ A quasi-optical gyrotron as claimed in claim 1, wherein the mirrors are separated by a distance of more than about 100 half wavelengths.

9. A quasi-optical gyrotron as claimed in claim 1, comprising:

means for generating a slowly changing auxiliary magnetic field which is superimposed on the static magnetic field.

10. A quasi-optical gyrotron as claimed in claim 10, wherein the electromagnetic radiation is generated in the form of pulses, and said means for varying the distance between the mirrors varies the distance between the mirrors during the duration of a pulse of said electromagnetic radiation.

* * * * *